US006857954B2

(12) United States Patent
Luedtke

(10) Patent No.: US 6,857,954 B2
(45) Date of Patent: Feb. 22, 2005

(54) PORTABLE SEAT COOLING APPARATUS

(75) Inventor: David Luedtke, Los Altos, CA (US)

(73) Assignee: Front-End Solutions, Inc., Los Altos, CA (US)

( * ) Notice: Subject to any disclaimer, the term of this patent is extended or adjusted under 35 U.S.C. 154(b) by 3 days.

(21) Appl. No.: 10/376,170

(22) Filed: Feb. 28, 2003

(65) Prior Publication Data

US 2004/0171343 A1 Sep. 2, 2004

(51) Int. Cl.[7] .................................................. A47C 7/74
(52) U.S. Cl. ................................. 454/120; 297/180.11
(58) Field of Search ............................. 454/120, 143; 297/180.11

(56) References Cited

U.S. PATENT DOCUMENTS

| | | | | |
|---|---|---|---|---|
| 1,356,493 A | * | 10/1920 | Kerr, Sr. ..................... | 297/255 |
| 1,475,912 A | * | 11/1923 | Williams .................... | 454/120 |
| 4,712,832 A | * | 12/1987 | Antolini et al. ........ | 297/180.11 |
| 5,370,439 A | | 12/1994 | Lowe et al. | |
| 5,372,402 A | * | 12/1994 | Kuo ....................... | 297/180.13 |
| 5,411,318 A | * | 5/1995 | Law ....................... | 297/452.45 |
| 5,613,729 A | | 3/1997 | Summer, Jr. | |
| 5,924,767 A | * | 7/1999 | Pietryga ................. | 297/180.13 |
| 6,494,534 B1 | * | 12/2002 | Li ........................... | 297/217.4 |
| 6,511,125 B1 | * | 1/2003 | Gendron ................ | 297/180.11 |

* cited by examiner

Primary Examiner—Derek S. Boles
(74) Attorney, Agent, or Firm—Robert Moll

(57) ABSTRACT

The present invention relates to a seat or chair cooling apparatus. In an embodiment the seat cooling apparatus cools the back of a user without the need of forced air. The seat cooling apparatus includes an array of conduits held in place by a set of supports to form a heat exchanger. Heat from the contact surfaces is removed by free convection, an upward air movement due to density difference. When the seat cooling apparatus is in the preferred substantially vertical arrangement, the warm air exiting the conduits is replaced by cooler air entering the conduits. A seat securing attachment secures the heat exchanger components to a seat. The seat cooling apparatus shapes into the back of the user to provide comfort that is effective in cooling. The seat cooling apparatus can be light weight, portable, and occupies little space, can be quickly installed and removed, easily cleaned and is very low cost to manufacture. In another embodiment, the seat cooling apparatus is easily connected to a forced air cooling source to increase the cooling rate if desired by the user.

23 Claims, 3 Drawing Sheets

PORTABLE SEAT COOLING APPARATUS

BACKGROUND

The present invention relates to a portable seat cooling apparatus.

Many of us have felt the pain of sitting against the seat of a vehicle in hot weather. In this context, air conditioning is initially irrelevant to the problem. This is because the sun has had a long time to heat the seat; the air conditioning has had little time to cool it off, and once we sit cool air cannot flow between the seat and our back to carry away the heat. Some deal with the problem by not sitting back until the seat cools off. Others have tried to solve the problem with a bit more sophistication by providing seat coolers using forced convection. The forced convection seat coolers add complexity. For example, if a battery powered pump provides the forced air stream, the system requires a battery, a pump, and a system for charging the battery, etc. If existing vehicle ventilation provides the forced air, the system requires hose(s) and attachments to connect to the seat cooler to the existing vehicle ventilation. In addition, using the existing ventilation will reduce the air delivered to other parts of the vehicle. Forced convection seat coolers have also used small openings that clog with dust over time reducing cooling efficiency until the user cleans the openings. This is tedious and time consuming and some may discard the seat cooler at this point. Forced air seat coolers are left in the vehicle even when not needed to save the time required to connect the components, which get in the way.

Fabric seat covers are also inadequate because they rely on cooling arising from bellowing when a person shifts in the seat. However, trapped hot air in the fabric tends to stay trapped and movement required to generate the cooling may not occur. The fabric may even build up heat due to the fabric's insulating properties. It would be desirable if a seat cooler could address these problems, and cool without the need for forced ventilation and the accessories mentioned earlier.

SUMMARY OF THE INVENTION

The present invention relates to a seat or chair cooling apparatus. In an embodiment the seat cooling apparatus cools the back of a user without the need of forced air. The seat cooling apparatus includes an array of conduits held in place by a set of supports to form heat exchanger components. Heat from the contact surfaces is removed by free convection, for example, from upward air movement due to density difference. When the seat cooling apparatus is in the preferred substantially vertical arrangement, the warm air exiting the conduits is replaced by cooler air entering the conduits. A securing attachment secures the heat exchanger components to the seat. The seat cooling apparatus conforms to the back of the user to provide comfort that is effective in cooling. The seat cooling apparatus is light weight, portable, and occupies little space, can be easily installed and removed, is easily cleaned and is low cost to manufacture. In another embodiment, the seat cooling apparatus is easily connected to a forced air cooling source to increase the cooling rate if desired by the user.

DETAILED DESCRIPTION OF THE PREFERRED EMBODIMENTS

The following description includes the best mode of carrying out the invention. The detailed description is made for the purpose of illustrating the general principles of the invention and should not be taken in a limiting sense. The scope of the invention is determined by reference to the claims.

Figure 1:
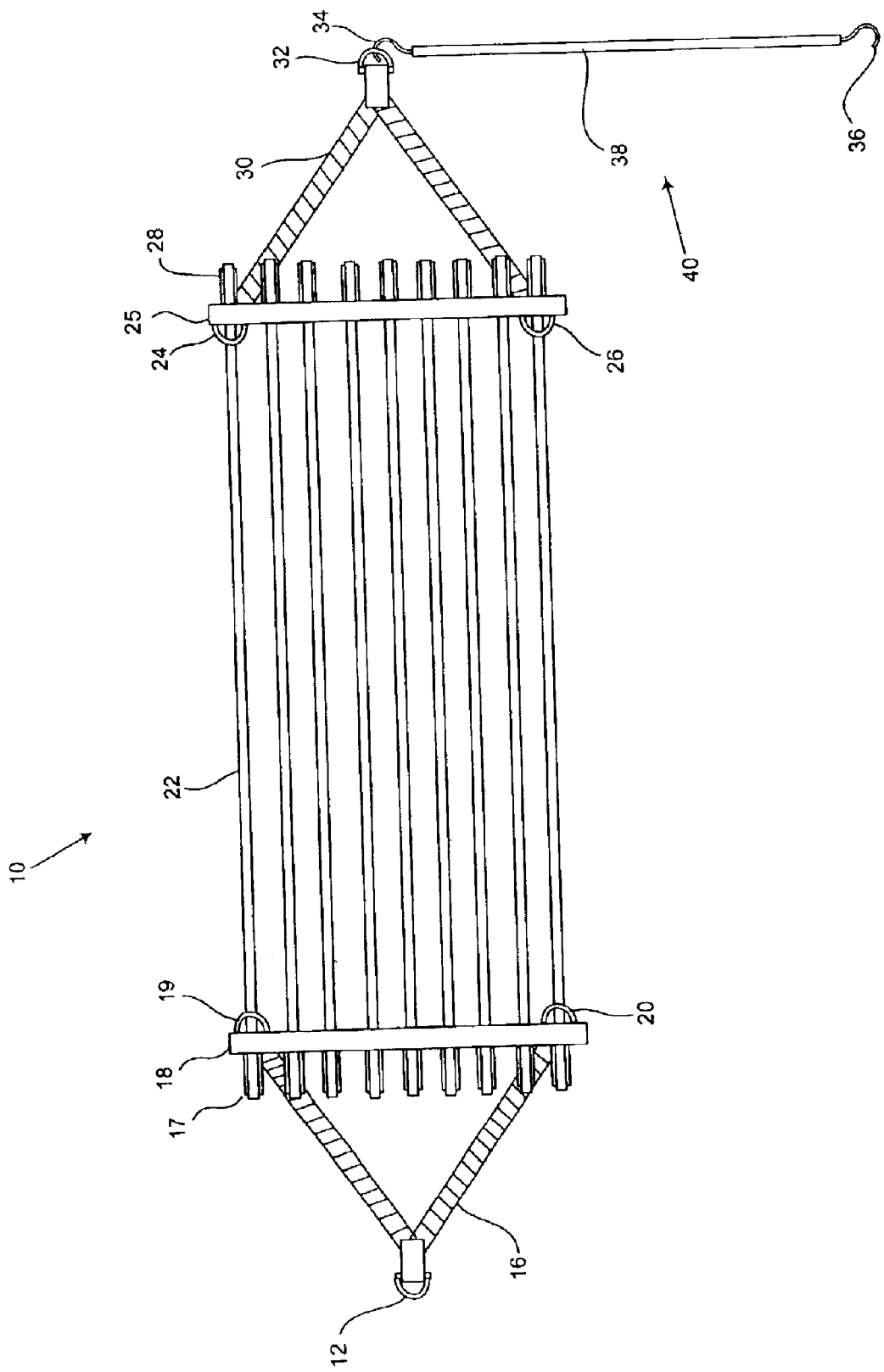
FIG. 1 is an embodiment of the seat cooling apparatus before being secured to the seat.

FIG. 1 illustrates an embodiment of the heat exchanger components of the seat cooling apparatus 10. The seat cooling apparatus 10 includes a set of conduits 22 arranged in a plane. A conduit is defined as an enclosure defining a passage. In an embodiment, the conduit 22 is a hollow acrylic or plastic tubing. It is not essential to the invention that the conduit 22 or tubing be made of an acrylic or plastic. It could be any material having similar durability, flexibility and heat conductivity as the acrylic tubing. In addition, the cross-sectional shape of each conduit 22 is not important to the invention as long as the passage is large enough to facilitate effective air movement in free convection.

In an embodiment, supports 18, 25 fix an array of conduits 22. In an embodiment the supports 18, 25 have a rectangular cross-section and include a set of spaced apart holes in two opposing surfaces to hold the array of conduits 22 parallel and spaced apart from each other. In an embodiment, the supports 18, 25 are made of deformable materials such as hollow reinforced vinyl tubing. It is not essential to the invention that the supports 18, 25 are made of vinyl. The supports 18, 25 could be any material having similar durability, flexibility and strength. The flexibility of the supports 18, 25 and the array of conduits 22 allow them to move relative to each other to conform to the user's back. This flexibility provides a substantial cushion to the user and protection against the conduits 22 wearing against a back rest 44 or vice-versa. To prevent the supports 18, 25 from sliding relative to the conduits 22, a set of collars 17, 28 are fastened onto the conduits 22. In an embodiment, the collars 17, 28 are cylinders fastened onto the conduits 22. In one embodiment, the collars 17, 28 and the conduits 22 are constructed of acrylic tubing and the collars 17, 28 have inner diameters that are slightly larger than the outer diameter of the conduits 22, and the collars 17, 28 are glued on both ends of the conduits 22 to trap the supports 18, 25.

Figure 2A:
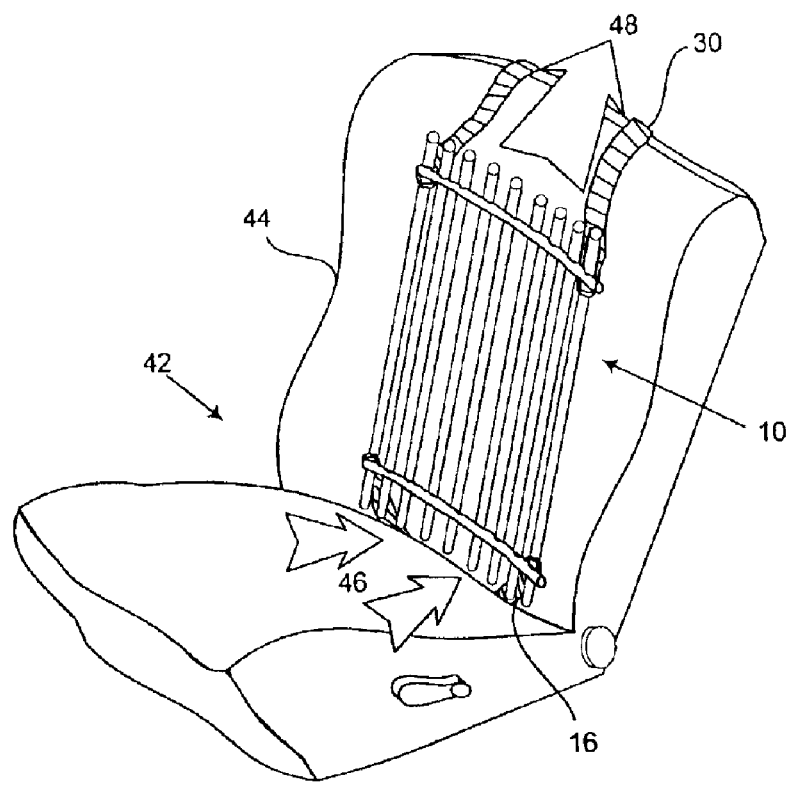
FIG. 2A is a perspective view of an embodiment of the seat cooling apparatus after being secured to a seat.

The components of FIG. 1 functions as a heat exchanger as shown in FIG. 2A where the heat of the user's back is conducted to the contact surfaces of the array of conduits 22 with the supports 18, 25. The conducted heat on the inner surfaces of the conduits 22 warms up the air inside. Due to the lower density of the warmer air, an air stream 48 rises then exits the top openings of the conduits 22. Cooler air stream 46 enters the bottom openings of the conduits 22 to replace the warmer air lost. The cooler air stream 46 removes heat from the interior surfaces of the conduits 22. Hence, free convection causes the air to circulate through the passages in conduits 22 facilitating cooling heat transfer without the need for forced convection.

As shown in FIG. 1, the seat cooling apparatus 10 includes a seat securing attachment. In an embodiment, the seat securing attachment includes a set of V-shaped holding straps 16, 30 made of material of sufficient strength such as nylon straps which are attached to the conduit 22 and/or the supports 18, 25. Also as shown, the illustrated seat securing attachment includes a set of rings 12, 19, 20 attached to holding strap 16, and a set of rings 32, 24, 26 attached to the holding strap 30. In an embodiment, all of rings 12, 19, 20, 24, 26, and 32 are D-shaped rings. In an embodiment, the rings 19, 20, 24, and 26 are locked to the four interior corners of the array of conduits 22 with the supports 18, 25.

In an embodiment, a commercially available hooked cord 40, including a pair of hooks 34, 36 connected to an elastic cord 38 is used to secure the seat cooling apparatus 10 to the back rest of a seat or a chair.

FIG. 2A is a perspective view in an embodiment showing the seat cooling apparatus 10 secured vertically to the back rest 44 of the vehicle seat 42 with certain clearance to allow free passages of air stream 46 to enter from the bottom, and to allow the air stream 48 to exit from the top. The holding strap 16 is brought behind the bottom of the back rest 44. The end of the holding strap 30 is wrapped over the top of the back rest 44.

Figure 2B:
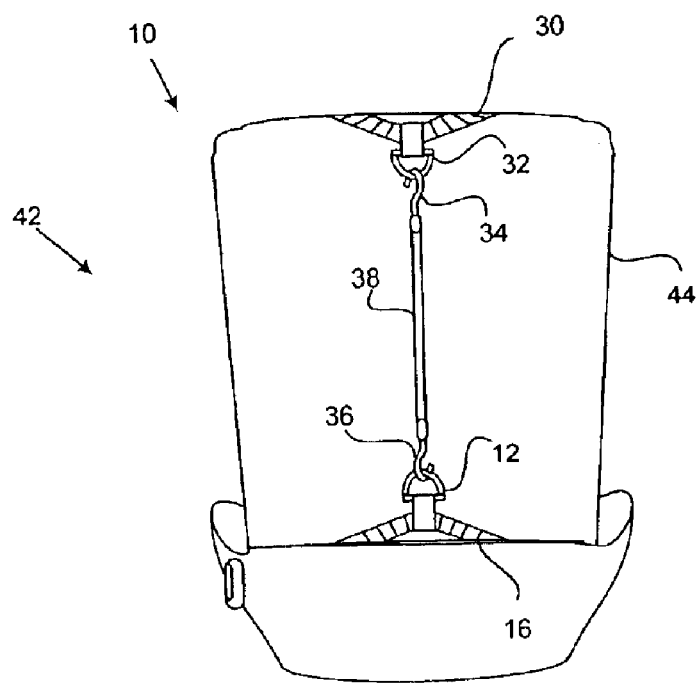
FIG. 2B is a rear view of the seat cooling apparatus and seat shown in FIG. 2A, which shows part of the securing attachment.

FIG. 2B is a rear view of the vehicle seat 42 showing an embodiment of the seat securing attachment of the seat cooling apparatus 10. The hooks 34, 36 on the ends of the elastic cord 38 engage the D-rings 32, 12 with the elastic cord 38 providing sufficient tension to secure the seat cooling apparatus 10 in place to the back rest 44 of various sizes. The seat cooling apparatus 10 can easily be removed by quick disengagement of the hooks 34 or 36 from the rings 32 or 12.

Figure 3:
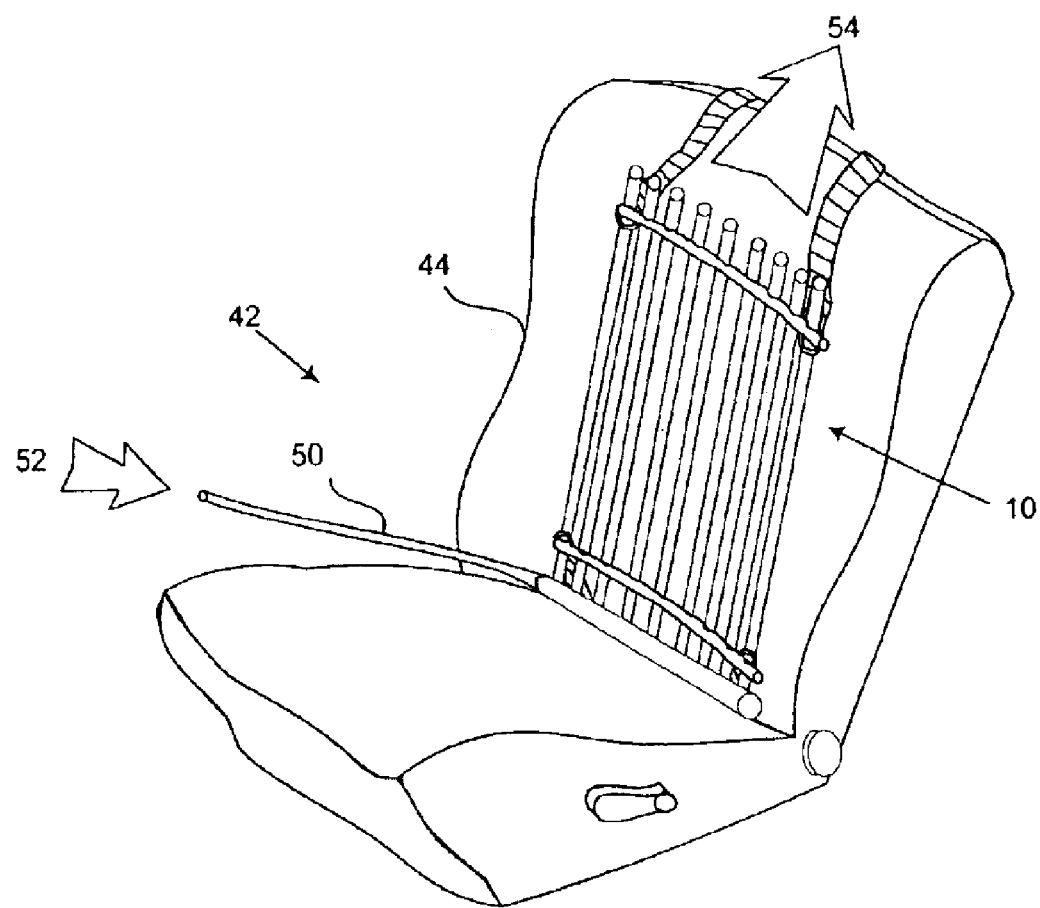
FIG. 3 is a perspective view of another embodiment of the seat cooling apparatus using forced air cooling.

Those skilled in the art will recognize that the seat cooling apparatus 10 can be used in conjunction with forced air stream as an aid. FIG. 3 shows in an embodiment where a cooler forced air stream 52 from a ventilating system is blown into a cooler accessory 50 that connects to the openings of the seat cooling apparatus 10, and warmer air stream 54 exits the conduits 22. The cooler forced air stream 52 creates a positive pressure providing substantially higher volume of air flow inside the conduits 22 to cause higher heat transfer rate by forced convection facilitating higher cooling effects.

The small size and portability makes the invention easy to install, transfer and store. There are other applications such as strapping to the back rest of benches, home or office chairs, yard and foldable chairs to provide cooling of the back of the user. The few components and simplicity in design of the seat cooling apparatus 10 keeps the manufacturing costs low. Other possible applications for the seat cooling apparatus 10 only depend on the imagination of the user.

What is claimed is:

1. A portable seat cooling apparatus for a user adapted to attach to a seat, comprising:
   an array of spaced apart conduits defining passages wherein air can freely move between the array of spaced apart conduits when the user rests against the apparatus;
   supports spaced from each other and attached to the array of conduits; and
   a securing attachment attached to the array of conduits and/or the supports to secure the apparatus to the seat and wherein air moves by convection through the passages to remove heat transferred through the array of conduits when the apparatus is secured to the seat.

2. The portable seat cooling apparatus of claim 1, wherein the array of spaced apart conduits comprises parallel spaced apart deformable tubing and the supports are attached to the opposing ends of the array of spaced apart conduits.

3. The portable seat cooling apparatus of claim 1, wherein the supports and the array of spaced apart conduits are made of a flexible and/or deformable material that allows the array of spaced apart conduits and the supports to flex, move, and conform to the user's back when the apparatus rests between the seat and the user.

4. The portable seat cooling apparatus of claim 1, further comprising a set of collars wherein each collar is fastened onto the outer end of a corresponding conduit to prevent the set of supports from moving relative to the array of spaced apart conduits.

5. The portable seat cooling apparatus of claim 1, wherein the array of spaced apart conduits and supports define interior corners, wherein the securing attachment includes a set of straps wherein each end of the V-shaped strap is attached to an interior corner.

6. The portable seat cooling apparatus of claim 1, wherein the securing attachment includes a set of rings that attach a V-shaped strap to one end of the array of spaced apart conduits and/or one support and another set of ring attach the other V-shaped strap to the opposite end of the array of spaced apart conduits and/or the other support, wherein each V-shaped strap is coupled to and decoupled to a cord such that the apparatus can be secured and removed from the seat.

7. The portable seat cooling apparatus of claim 1, wherein heat is removed by free convection through an upward air movement without external aid due to an air density difference in the passages of the array of spaced apart conduits.

8. The portable seat cooling apparatus of claim 1, further comprising a forced air stream, wherein heat is further removed by forced convection with the aid of the forced air stream blowing through the passages of the array of spaced apart conduits.

9. The portable seat cooling apparatus of claim 1, wherein the securing attachment secures the apparatus vertically to the back rest of the seat with clearance to allow air to enter into the bottom openings and wherein the air exits from the top openings of the array of spaced apart conduits and wherein the securing attachment includes a holding strap brought beneath the bottom of the back rest and the end of the holding strap is wrapped over the top of the back rest.

10. The portable seat cooling apparatus of claim 1, wherein the securing attachment includes a set of hooks on the ends of an elastic cord engaging rings wherein the elastic cord provides sufficient tension to hold the apparatus in place to the back rests of various sizes and the apparatus can easily be removed by quick disengagement of the hooks from the rings.

11. A portable seat cooling apparatus adapted to attach to a seat, comprising:
   an array of tubing defining passages parallel to the back of the seat;
   supports spaced from each other and attached to the array of tubing, wherein the array of tubing and supports are heat exchanger components; and
   means for securing the heat exchanger components to the seat wherein air moves by free convection through the passages to remove heat transferred through the array of tubing when the heat exchanger components are secured to the seat.

12. The portable seat cooling apparatus of claim 11, wherein the array of tubing comprises parallel spaced apart deformable tubing and the supports are attached to the opposing ends of the array of tubing.

13. The portable seat cooling apparatus of claim 11, wherein a flexible and/or deformable material is used for the supports and the array of tubing that allows the array of tubing and the supports to flex, move, and conform to the user's back when the heat exchanger components rest between the seat and the user.

14. The portable seat cooling apparatus of claim 11, further comprising a set of collars wherein each collar is fastened onto the outer end of a corresponding tubing to prevent the set of supports from moving relative to the array of tubing.

15. The portable seat cooling apparatus of claim 11, wherein heat is removed by free convection through an upward air movement without external aid due to an air density difference in the passages of the array of tubing.

16. The portable seat cooling apparatus of claim 11, further comprising a forced air stream, wherein heat is further removed by forced convection with the aid of the forced air stream blowing through the passages of the array of tubing.

17. A portable seat cooling apparatus to be secured to the back rest of a seat, comprising:
    an array of conduits, wherein the array of conduits define passages large enough to facilitate heat transfer from free convection of air moving through the passages;
    deformable supports fixing the array of conduits but permitting the array of conduits to conform to the user; and
    a securing attachment attached to the array of conduits and/or the supports to secure the apparatus to the seat.

18. The portable seat cooling apparatus of claim 17, wherein the array of conduits are hollow tubing and the deformable supports has a rectangular cross-section and include a set of spaced apart holes through two sides of the support for fixing the hollow tubing spaced apart and parallel to each other.

19. The portable seat cooling apparatus of claim 17, wherein the array of conduits and supports define interior corners and wherein the securing attachment includes a set of straps wherein each end of the V-shaped strap is attached to an interior corner.

20. The portable seat cooling apparatus of claim 17, wherein the securing attachment includes a set of rings that attach a V-shaped strap to one end of the array of conduits and/or one support and another set of rings attach the other V-shaped strap to the opposite end of the array of conduits and/or the other support, and wherein each V-shaped strap is coupled to and decoupled to a cord such that the apparatus can be secured and removed from the seat.

21. The portable seat cooling apparatus of claim 17, wherein the securing attachment secures the apparatus vertically to the back rest of the seat with clearance to allow air to enter into the bottom openings, wherein the air exits from the top openings of the array of conduits, and wherein the securing attachment includes a holding strap brought beneath the bottom of the back rest and the end of the holding strap is wrapped over the top of the back rest.

22. The portable seat cooling apparatus of claim 17, wherein the securing attachment includes a set of hooks on the ends of an elastic cord engaging rings, wherein the elastic cord provides sufficient tension to hold the apparatus in place to back rests of various sizes and the apparatus can easily be removed by quick disengagement of the hooks from the rings.

23. A portable seat cooling apparatus adapted to attach to a seat, comprising:
    an array of conduits defining passages;
    supports spaced from each other and attached to the array of conduits, wherein the array of conduits and supports are heat exchanger components;
    means for securing the heat exchanger components to the seat wherein air moves by free convection through the passages to remove heat transferred through the array of conduits when the heat exchanger components are secured to the seat; and
    a set of collars wherein each collar is fastened onto the outer end of a corresponding conduit to prevent the set of supports from moving relative to the array of conduits.

* * * * *